Sept. 1, 1953     O. C. NORTON     2,650,708
WASTE DISPOSING DEVICE

Filed Sept. 20, 1948     2 Sheets-Sheet 1

INVENTOR.
ORLO C. NORTON
BY
Florian G. Miller
Atty.

Sept. 1, 1953 O. C. NORTON 2,650,708
WASTE DISPOSING DEVICE
Filed Sept. 20, 1948 2 Sheets-Sheet 2

INVENTOR.
ORLO C. NORTON
BY
Florian G. Miller
Atty.

Patented Sept. 1, 1953

2,650,708

UNITED STATES PATENT OFFICE 2,650,708

WASTE DISPOSING DEVICE

Orlo C. Norton, Erie, Pa.

Application September 20, 1948, Serial No. 50,130

5 Claims. (Cl. 210—57)

1

This invention relates to disposal apparatus for disposing of waste mixed with a fluid and it relates more particularly to apparatus for connection to a sewer line for breaking up and separating waste material and disposing of a substantial portion of the waste material in the sewer line.

Bottling works in the soft drink business and breweries have experienced considerable trouble in the disposal of broken glass, labels, sticks, stones, etc. emanating from a bottle cleaning machine. It is now necessary to manually dispose of all of this waste material which requires a considerable amount of floor space, considerable labor with resulting considerable expense, and in many instances it has been necessary to slow or shut down the machinery to clear the waste coming therefrom. The waste around these machines makes conditions unsafe for the operators and efficiency is greatly impaired. Old labels and like material cake together due to adhesives in the labels and soda and other chemicals used in the washing operation. These have heretofore stopped up sewer lines where it was attempted to dispose of them in the sewer lines.

Applicant's invention makes it possible to dump all of the waste from a bottle cleaning machine directly into a disposal unit installed at the floor level whereby all disposable material is forced to the sewer line in a broken-up condition and all solid material is removed from the disposal unit by basket means.

It is, accordingly, an object of my invention to provide a waste disposal unit which is simple in construction, economical in cost, economical in manufacture, and efficient in operation.

Another object of my invention is to provide a waste disposal unit which is substantially free from siphonage.

Another object of my invention is to provide novel agitating and straining means in a disposal device.

Another object of my invention is to provide novel means for preventing stoppages in the outlet of a waste disposal unit.

Another object of my invention is to provide novel means for removing broken glass and other solids from waste in a disposal unit.

Another object of my invention is to provide a novel waste disposal unit adapted to be connected to a sewer line which breaks up and disposes of all floatable waste material.

Another object of my invention is to provide novel agitating means in a waste disposal unit.

Other objects of my invention will become evident from the following detailed description, taken in conjunction with the accompanying drawings, in which Fig. 1 is a vertical sectional view taken on the line 1—1 of Fig. 2;

Figure 5:
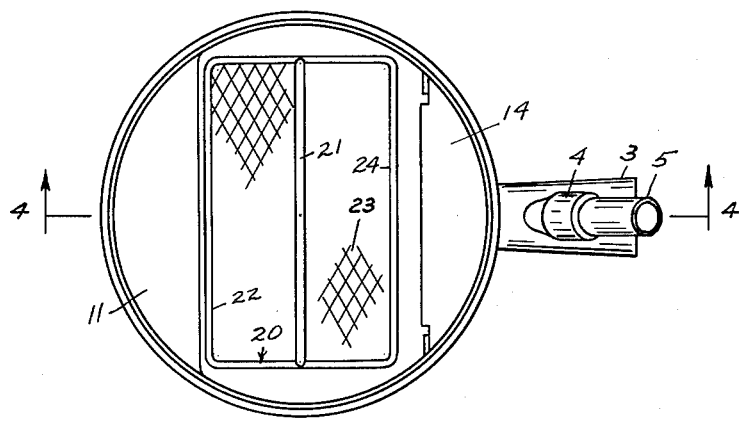
Figure 4:
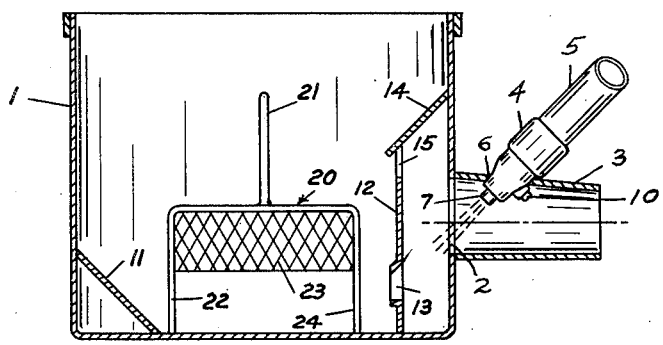

2 looking towards the outlet in my novel waste disposal unit;

Fig. 4 is a vertical sectional view taken on the line 4—4 of Fig. 5; and

Fig. 5 is a top plan view of a modified form of my novel waste disposal unit.

Figure 2:
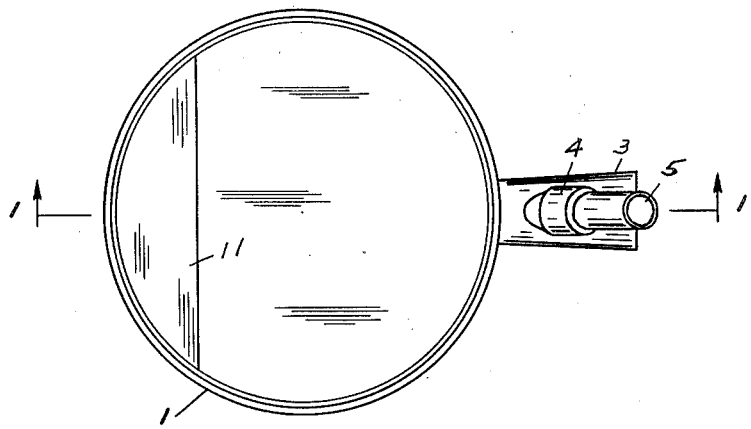
Fig. 2 is a top plan view of my novel waste disposal unit.
Figure 1:
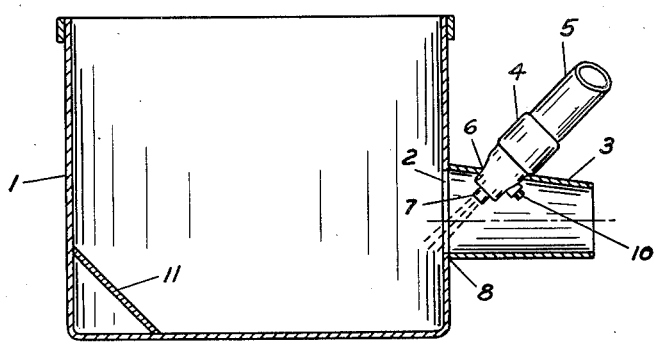
Figure 3:
Fig. 3 is a fragmentary side elevational view

Referring now to the drawings, Figs. 1, 2, and 3 show an open cylindrical container 1 having a generally elliptically shaped outlet 2 with an outlet pipe 3 in connection therewith. A nozzle 4 connected to a water supply pipe 5 extends angularly through aperture 6 in the upper side of the outlet pipe 3. The nozzle 4 is disposed angularly with relation to the center line of the outlet pipe 3. The nozzle 4 has a jet 7 for directing a flared screen of water into the container 1 through the outlet 2, the screen of water clearing the bottom 8 of the outlet 2 by approximately 1 to 2 inches. The sides of the screen of water or spray from the jet 7 substantially cover the entire width of the outlet 2 except for approximately an inch clearance on each side thereof to permit the passage of small particles of waste. It will thus be seen that the spray of water from the jet 7 will substantially cover the outlet 2 except for a small clearance between the bottom 8 of the outlet 2 and on the sides of the outlet 2 between the spray and the sides thereof. A second jet 10 at right angles to the jet 7 is disposed in the nozzle 4 and is directed away from the outlet 2 so as to move the waste which passes the spray from the jet 7 to a sewer line which is connected to outlet pipe 3 by any suitable conventional pipe connections. The jet 10 further agitates the waste material and breaks up any material which has not been broken up by the spray from the jet 7. An inclined baffle 11 is disposed in the container 1 opposite to the outlet 2 so that the water emanating from the jet 7 will move around the baffle 11 thereby causing it to move in somewhat of a circular pattern to agitate the water and waste in the container 1.

In operation, waste material such as broken bottles, labels, and other waste material is thrown into the open container which is suitably installed at the level of the floor adjacent to a bottle washing machine. It is thus only necessary to shove the waste material into the container 1 as it accumulates. The smaller particles will immediately pass the screen of water formed by the jet 7 into the outlet pipe 3 between the sides of the screen and the sides of the outlet 2. The caked material will be agitated by the spray from the jet 7 until it breaks up into fine enough particles whereby it may pass the screen of water covering the outlet 2. Comparatively heavy material such as glass will remain in the bottom of the container 1 and all of the lighter floatable material will be broken up and passed outwardly from the container 1 in comparatively small sized particles. Anything that is too large to pass the screen formed by the jets of water from the jet 7 will be retained in the container 1. The water under pressure from the jet 10 forces the material which passes the water screen in the outlet 2 outwardly through the outlet pipe 3 to a sewer line and it prevents any stoppages therein and further serves to break up any particles which pass the water screen in the outlet 2.

In Figs. 4 and 5, I have shown a modified form of my invention wherein a transversely disposed baffle 12 is disposed in the container 1. The baffle 12 has an aperture 13 therein in alignment with the jet 7 so that the spray of water from the jet 7 passes directly through the aperture 13 into the body of the container 1. An inclined cover 14 is disposed over the baffle 12 and it is spaced therefrom to provide an opening 15 for the passage of floatable material to the outlet 2. All parts of the disposal unit shown in Figs. 4 and 5 are the same except for the addition of the baffle 12 and inclined cover 14.

The operation of the disposal unit shown in Figs. 4 and 5 is substantially the same as the disposal unit shown in Figs. 1 and 2. The screen of water from the jet 7 passes through the aperture 13 and strikes the inclined baffle 11 to provide a circular movement of the water to agitate the waste material therein and break up any of the waste material which is caked or which is held together by adhesives in labels or the like. The floatable material will pass through the opening 15 to the outlet pipe 3 and the heavier material will remain in the bottom of the container 1.

In Figs. 4 and 5, I show a basket 20 which also may be used in the container 1 shown in Figs. 1 and 2 for removing broken glass and other heavy material which remains in the bottom of the container 1. The basket 20 has a handle 21 on a frame 22 with wire mesh 23 supported by the frame 22. When the water passes into the container 1 under pressure from the jet 7, it is given a circular motion by the inclined baffle 11 thereby forcing the glass or other heavy material into the bottom of the container 1 to move along with the circulating water whereby it is thrown into the basket 20 which is closed on side 24. When the basket 20 is filled, it is removed from the container 1 and dumped. Normally, the basket is not disposed in the container 1 but it is only placed therein when it is desired to move glass or other heavy material retained in the bottom thereof. It will thus be seen that all material may be moved from the container 1 in a minimum of time and without the use of shovels or the like.

It will be evident from the foregoing description that I have provided a highly efficient disposal unit, particularly adaptable for use with bottle cleaning and like cleaning machines where broken glass, labels, sticks, etc. are encountered, the floatable material being entirely disposed of through the sewer line after being broken up in my waste disposal unit and the heavier material being removed from the container by a novel method of filling an open sided basket and utilizing the circulation of water normally used for breaking up the floatable and caked material entering the disposal unit.

A suitable grate may be disposed over the container 1.

Although I have described my invention as one for the disposal of waste, it has been found that it is particularly adaptable to the washing of fabric and other material, especially where it has adhering particles which may be passed through the outlet to the drain.

Various changes may be made in the specific embodiment of my invention without departing from the spirit thereof or from the scope of the appended claims.

What I claim is:

1. A waste disposal unit comprising a container, an outlet pipe extending outwardly from the lower portion of one side of said container, said outlet pipe having an inner open end in the lower side of said container, an angularly, downwardly extending nozzle disposed in the upper side of said outlet pipe and spaced a predetermined distance from the inner open end of said outlet pipe directed into said container through the inner open end of said outlet pipe, and means for connecting said nozzle to a source of fluid, the fluid from said nozzle defining a screen of fluid extending transversely of the inner open end of said outlet pipe and being spaced outwardly from the bottom thereof and inwardly from the sides thereof opposing the exit of large pieces of material through said outlet pipe while further agitating same in said container.

2. A waste disposal unit as set forth in claim 1 wherein a transverse baffle is disposed in said container spaced from the inner open end of said outlet pipe in the side of said container having an aperture in substantial alignment with said screen of fluid.

3. A waste disposal unit comprising an open container, an inclined baffle disposed in the bottom of and on one side of said container, an outlet pipe having an inner open end in the lower side of said container opposite to said baffle, an angularly, downwardly extending nozzle member disposed in the upper side of said outlet pipe for directing into said container through the inner open end of said outlet pipe and a second nozzle member directed toward the opposite end of said outlet pipe to direct water away from the open end of said outlet pipe, and a source of water for said nozzle members, said nozzle member directed towards said container being at an acute angle with reference to the axis of said outlet pipe and the fluid therefrom defining a transverse screen in the inner open end of said outlet pipe spaced from the inner sides of said inner open end of said outlet pipe and spaced outwardly from the bottom side thereof.

4. A waste disposal unit as set forth in claim 3 wherein a transverse, vertically extending baffle is spaced from the inner open end of said outlet pipe in said container having an aperture in alignment with the nozzle member directed toward the container to direct the water therefrom into said container.

5. A waste disposal unit as set forth in claim 3 wherein an inclined transverse baffle is disposed above said vertically extending baffle and spaced therefrom.

ORLO C. NORTON.

References Cited in the file of this patent

UNITED STATES PATENTS

| Number | Name | Date |
|---|---|---|
| 1,157,092 | Du Rell | Oct. 19, 1915 |
| 1,186,627 | Wade | June 13, 1916 |
| 1,495,303 | Heidelberg | May 27, 1924 |
| 2,188,847 | Streander | June 30, 1940 |
| 2,237,091 | Stephanoff | Apr. 1, 1941 |
| 2,381,760 | Latham | Aug. 7, 1945 |
| 2,405,576 | Heyman | Aug. 13, 1946 |
| 2,447,425 | Norton et al. | Aug. 17, 1948 |